INVENTORS
Mordechai H. Diskin + Amnon David
BY
Bierman + Bierman
ATTORNEYS

Dec. 2, 1969   M. H. DISKIN ET AL   3,481,334
APPARATUS FOR URINARY BLADDER IRRIGATION
Filed Oct. 5, 1966   3 Sheets-Sheet 2

INVENTORS
Mordechai H. Diskin + Amnon David
BY
ATTORNEYS

Dec. 2, 1969  M. H. DISKIN ET AL  3,481,334
APPARATUS FOR URINARY BLADDER IRRIGATION
Filed Oct. 5, 1966  3 Sheets-Sheet 3

INVENTORS
Mordechai H. Diskin + Amnon David
BY
Bierman + Bierman
ATTORNEYS

United States Patent Office 3,481,334
Patented Dec. 2, 1969

3,481,334
APPARATUS FOR URINARY BLADDER IRRIGATION
Mordechai H. Diskin, 9 Alexander Zeid St., Haifa, Israel, and Amnon David, Doctors Quarters, Governmental Hospital, Tel-Hashomer, Israel
Filed Oct. 5, 1966, Ser. No. 588,643
Claims priority, application Israel, Oct. 7, 1965, 24,431
Int. Cl. A61m 1/00
U.S. Cl. 128—230                6 Claims

ABSTRACT OF THE DISCLOSURE

An apparatus for the automatic irrigation of urinary bladders includes a means to cycle the inflation, deflation and flushing of the bladder. The apparatus includes a supply vessel, a flow control valve, a supply tube with a bladder catheter, timing means, and a pump having an attached variable speed transmission.

---

This invention relates to an apparatus for urinary bladder irrigation.

It is the object of this invention to provide an apparatus for the automatic irrigation of urinary bladders. This irrigation consists of the automatic performance of one or more cycles consisting of the steps of inflation, deflation, and flushing of the urinary bladder with a solution prescribed for this purpose, without requiring the attendance of an operator, except to initially set up and start the apparatus' action.

Previous medical practice has been to perform all operations for flushing, inflation and deflation of urinary bladders manually, by adjusting the setting of a restriction valve in an inlet tube conducting the solution used for flushing into a catheter inserted into the bladder, and by adjusting the setting of another similar valve in a discharge tube connected to the catheter for conducting the solution out of the bladder.

The first type of irrigation cycle in current practice consists of the following three steps:

(1A) A steady flushing of the urinary bladder at a low rate of flow of flushing solution, that does not cause any inflation of the bladder. This part of the irrigation cycle is of a relatively long time duration.

(1B) The relatively rapid inflation of the urinary bladder by charging fluid into it at a flow rate considerably greater than the rate in step (1A). The inflation during this part of the cycle is terminated after a certain desired period of time, or when the pressure in the bladder reaches a predetermined value.

(1C) The rapid deflation of the bladder (all references to "bladder" henceforth will mean "urinary bladder") by permitting it to be emptied of the fluid which it contains. During this deflation, inflow to the bladder is resumed at a rate equal to that in step (1A).

This step ends when the bladder is deflated, and the end of this step completes the cycle.

The cycle is resumed with step (1A).

A second type of irrigation cycle in current practice consists of the following two steps:

(2A) A steady inflation of the bladder by charging it with flushing solution at a constant small rate of flow over a relatively long period of time. The inflation terminates after a certain desired period of time, or when the bladder pressure reaches a predetermined value.

(2B) Rapid deflations of the bladder by permitting the emptying out of the fluid it contains. During deflation, the steady inflow of flushing solution is maintained at the flow rate of step (2A). The deflation step is terminated after a certain desired period of time or when the bladder is deflated. The end of this step completes the cycle.

The cycle is resumed with step (2A).

The requirements of the first cycle, steps 1A, B, and C, are such that in previous practice the cycle was not performed automatically, but required operation by an operator.

Regarding the operations of the second cycle—steps (2A) and (2B)—these were usually also carried out manually. One technique in previous practice for accomplishing the cycle automatically was by using a siphon tube after the outlet tube of the catheter was inserted into the bladder. The siphon is primed when the pressure in the bladder is sufficiently great to force liquid up the leg of the siphon and over into the drain (or outlet) leg of the siphon. This device, used in previous practice, is thus responsive to pressure in the bladder to eitehr permit steady inflation of the bladder (2A), or rapid deflation (2B). According to this previous device, the length of time the inflation and deflation steps persist are not independently set variables. In addition, using this previous technique, the operator must make a manual adjustment of the flow rate(s) desired.

In order to perform the above-described cycles, any apparatus used for irrigating bladders should have incorporated into it—at the very least—means for varying the flow rate(s) of the flushing solution into the bladder, and means for varying the duration of time of each step of the cycle. Additionally, it should be provided with means for sensing and indicating pressure in the bladder, and means for terminating the inflation steps of the cycle, when bladder pressure reaches a predetermined value. Finally, it is highly desired that the above-described cycles be performed automatically in order not to require the attendance of an operator to perform the bladder irrigation cycles.

The advantages claimed for one or more of the forms of the apparatus of this invention, to be described more fully in the following section, are:

(1) It provides for the automatic irrigation—flushing, inflation and deflation—of bladders according to a predetermined cycle based upon time and/or bladder pressure.

(2) The rate of flushing, the rate of inflation, and the length of the steps in the cycle(s) can be set to any predetermined values, within the limitations set by the apparatus size, depending upon the needs of the individual patient. Flow rates, and lengths of time for each of the steps can be changed conveniently during the treatment process if this is indicated.

(3) The apparatus is provided with a means for indicating bladder pressure and includes means for terminating bladder inflation as soon as a predetermined pressure is obtained.

(4) The apparatus makes use of a closed system of sterilized piping from the supply bottle to the bladder. This greatly reduces the danger of infection. The system piping and catheter can be sterilized on their own. The pump(s) and valve(s) are external to the piping and do not constitute a source of contamination for the flushing solution.

The invention is illustrated, in several of its modifications, given by way of example in its application to urinary bladder irrigation, in the accompanying drawings, in which.

Figure 1:
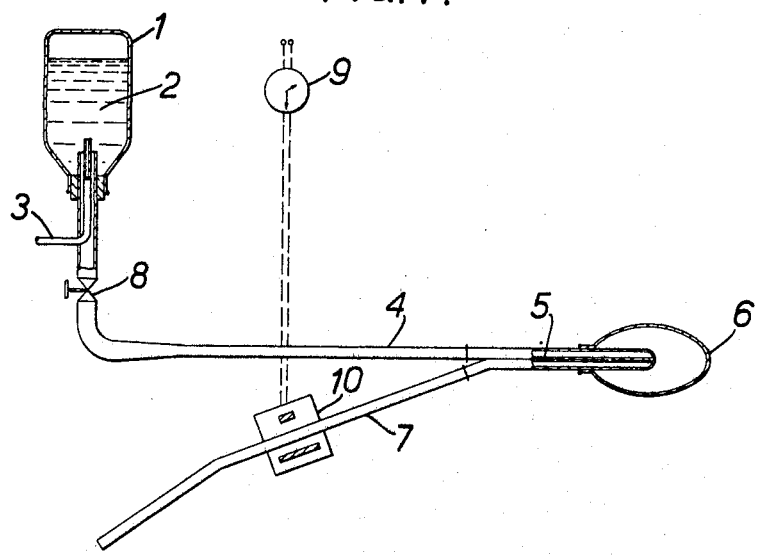
FIG. 1 is a schematic drawing showing the arrangement of the elements of the apparatus which utilizes gravity flow of the irrigating fluid at a single flow rate.

The urinary bladder irrigation apparatus illustrated in FIG. 1 comprises a container 1 for supplying the irrigation fluid 2 to the irrigation system, which container has provided to it an air inlet 3 permitting the irrigation fluid to flow under the action of gravity, through the flow rate regulating valve 8, the catheter supply tube 4, the inlet tube of catheter 5, the urinary bladder 6, the outlet tube of catheter 5, and the discharge tube 7. The flow rate is determined by the setting of the valve 8. The irrigation cycle is controlled by the outlet flow control 10, which receives its commands from a timing device 9.

The outlet flow control 10, may be one of a number of broad classes of devices used to control flow. For example, it could be constructed of a simple electric solenoid clamp that either firmly grips the discharge tube 7 (which in the case should be of a flexible material such as plastic tubing), thus preventing flow, or, when the solenoid clamp is not actuated, the tube 7 permits free flow of fluid through itself.

The outlet flow control device 10 could be a solenoid operated valve which is either opened or closed to permit or prevent flow. The outlet flow control device could also be a hydraulic valve either opened or closed, obtaining command power electrically, pneumatically, or hydraulically, for example.

The timing device 9 could be, for example, an electrically driven clock having a set of timing cams or contacts to open and close according to the cycle of irrigation desired. The timing device need not be electrically operated. It could be based on mechanical, hydraulic, pneumatic or other means of timing, with provision for providing a command to the outlet flow control device 10.

Figure 2:
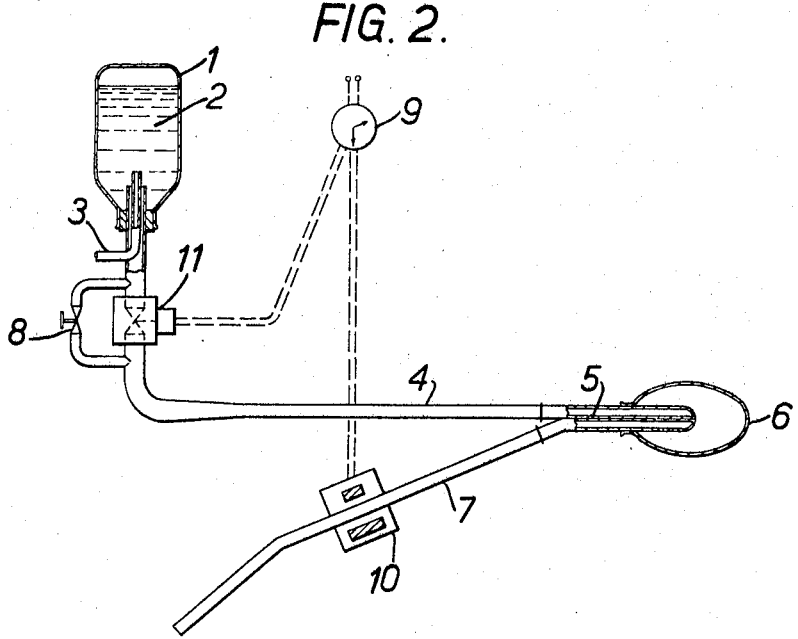
FIG. 2 is a schematic drawing showing the arrangement of the elements of the apparatus which utilizes gravity of the irrigating fluid, but having a choice of two flow rates.

The bladder irrigation system illustrated in FIG. 2 is similar to the system of FIG. 1, except that in addition, a second flow rate regulating valve 11 is used in parallel with the first flow regulating valve 8. This arrangement permits the establishment of two independent rates of flow. For example, in initially adjusting the apparatus for the desired low flow rate flushing (which does not cause inflation of the bladder), valve 11 is maintained in its closed position, and outlet control 10 is not energized. The desired low rate of flow is obtained by adjusting the flow regulating valve 8. When timer 9 gives the valve 11, which has been previously set to the higher rate of flow, a command to open, and at the same time closes the outlet control 10, the inflation part of the irrigation cycle commences.

Irrigating fluid 2 from the container 1 will now flow at a relatively high rate, through valve 11, the catheter supply tube 4, the catheter 5, and into the bladder 6. The bladder will then begin to inflate as irrigating fluid is forced into it. After a sufficient period of time, the timer 9 acts to de-energize both valve 11 (which closes), and outlet flow control 10 (which opens). The low flow rate flushing mode of operation is thus re-established.

Figure 3:
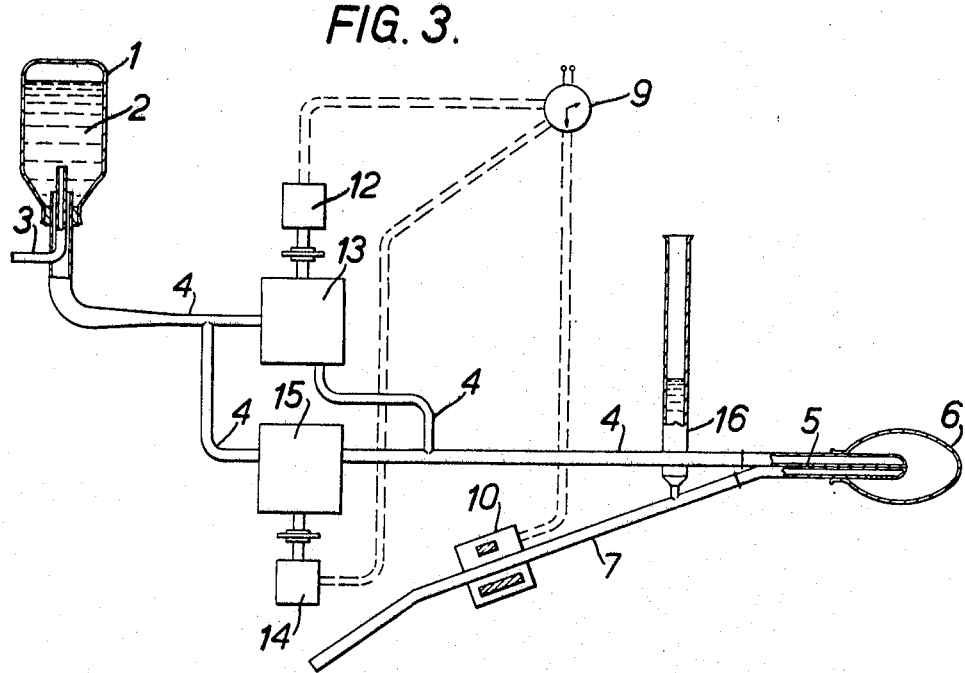
FIG. 3 is a schematic drawing showing the arrangement of the elements of the apparatus which utilizes pumps to circulate the irrigating fluid.

FIG. 3 shows an apparatus for irrigating bladders in which the pressure for driving the irrigating solution through the system is provided by two pumps; pump 13 driven by motor 12, and pump 15 driven by motor 14. In general, one pump is set to deliver a low flow rate, and the other is set to deliver a relatively high flow rate. During flushing, the low flow rate pump (say pump 13) would deliver irrigating solution to the bladder. For this part of the cycle, outlet flow control 10 would be open permitting discharge of fluid out through the discharge tube 7. For rapid inflation of the bladder, the high flow rate pump 15 is used; either by itself or in conjunction with pump 13. The pumps are controlled from timing device 9 which, for the inflation part of the cycle also closes outlet flow control 10, thus permitting the irrigating fluid to be forced into the bladder 6, causing it to inflate, since the fluid is now without any outlet. To return to the flushing part of the cycle, timer 9 would act to de-energize outlet flow control 10, and at the same time would switch out the high flow rate pump 15.

Regarding motive power for pumps 13, and 15, alternatively, a single source of motive power could be used to drive both pumps, and on-off valves in the outlet lines of the pumps (operated on command from timer 9) would control the rates of flow. A piezometric tube 16 is shown connected to the discharge tube 7. The height to which liquid will stand in this tube is directly proportional to the pressure existing in the bladder. Further, since tube 16 is open to the atmosphere at its upper end, it acts as a safety device. If bladder pressure—for any reason whatsoever—is permitted to rise unchecked, liquid will overflow the open top without permitting the pressure to rise to dangerous levels. (This is particularly important when the apparatus uses pumps or other mechanical means, capable of exerting very high pressure, for forcing the irrigating solution through the system.)

Figure 4:
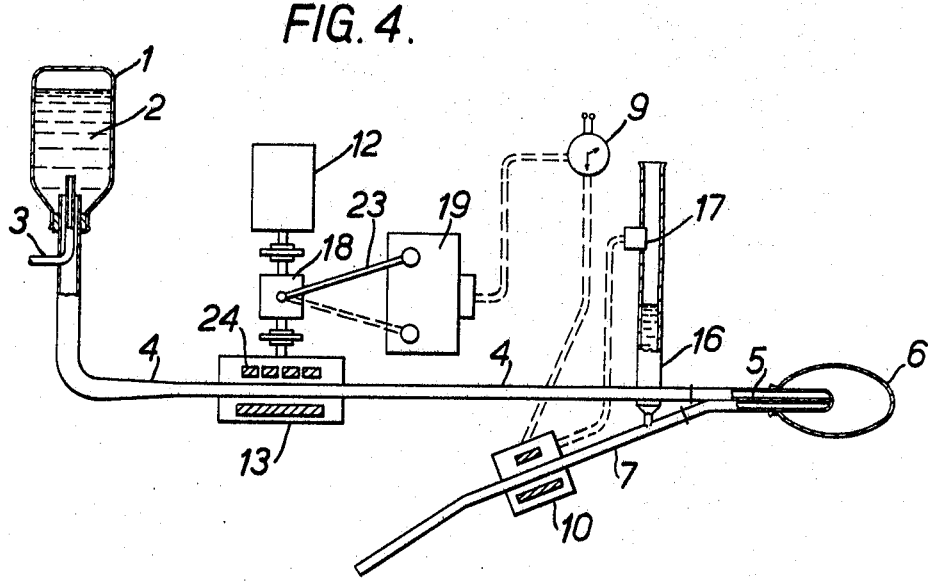
FIG. 4 is a schematic drawing showing the arrangement of the elements of the apparatus which utilizes a single variable flow pump to circulate the irrigating fluid.

FIG. 4 illustrates a form of the invention in which fluid is circulated through the system by a single pump 13 driven by motor 12, through a variable speed transmission device 18. A suitable pump for the application is a positive displacement pump. One such pump, the "Sigma" pump (manufactured by the Sigma Pump Co., U.S.A.) is excellently suited to the bladder irrigating devices of this invention.

In operation, the pump moves a series of "fingers" 24 up and down over the supply tube in what is called peristaltic action. The supply tube 4 would be have to be made in this case of flexible material (such as plastic or rubber tubing). An important advantage is obtained, since the irrigating solution never comes into contact with matter outside the sterilized supply bottle, tubing 4, catheter 5, discharge tube 7, and the bladder 6. Thus, all parts of the system other than the bladder coming into contact with the irrigating solution can be sterilized. The pump 13 circulates the solution without contacting the solution, and is thus no source of contamination.

For the low flow rate flushing, speed control lever 23 is located in the low speed position by the actuator device 19. The pump 13 is therefore driven at low speed. Outlet flow control 10 is de-energized, and solution is permitted to flow out of discharge tube 7, at the low rate of flow. For rapid inflation, timer 9 energizes actuator 19 which responds by forcing speed control lever 23 to the high speed position for the variable speed transmission unit 18. At the same time, outlet control 10 is energized, clamping down on discharge tube 7. Irrigating fluid thus flows into the bladder at a high flow rate, being driven by pump 13, now being operated at high speed. The actuator device 19 can be any one of a broad class of devices: electro-mechanical; electro-hydraulic; electro-pneumatic; hydraulic; or pneumatic; for example.

The function of actuator 19 is to convert a command signal for the timing device 9 to a mechanical output that drives speed control lever 23 of speed transmission unit 18, to either its low or its high position, depending upon the command from timer 9. An alternative, instead of the variable speed transmission shown in FIG. 4, is a power source whose speed is variable, which will be operated by actuator 19 and lever 23. The variable speed power source can be used to drive the motor 12 of the pump 13 at two speeds corresponding to high and low rates of flow of the pump. One form of actuator tester consisted of a reversible direction electric motor used to rotate a screw. A travelling nut (to which the speed control lever 23 was directly connected) moved linearly as the screw was rotated by the electric motor. Electric limit and motor reversing switches were fixed so as to be operated by the travelling nut. Thus, upon command from timer 9, the actuator motor was energized, and the nut moved lever 23 to its proper position.

The piezometric tube 16 of FIG. 4 is shown with a liquid level detection device 17 attached, whose purpose is to react to an excessive rise of solution level in the tube 16. (This condition occurring when pressure in the bladder is too high.) When excessive pressure occurs, liquid level detection device 17 acts to de-energize outlet flow control 10, and thus fluid from bladder 6 will be permitted to flow out rapidly, thus relieving excessive pressure and preventing further inflation of the bladder. The liquid level detection device could be in the form of electrodes that permit a current to pass through them when they are covered by the irrigating solution. Other forms of liquid level detectors are, for example, a photoelectric relay or float operated switch. In place of the piezometric tube 16, a Bourdon tube type or other type of pressure gauge may also be used to indicate bladder pressure. Equipped with a set of contacts that operate when a certain pressure is reached, this "pressurstat," by opening a set of contacts, de-energizes the outlet flow control 10 when bladder pressure gets too high.

Figure 5:
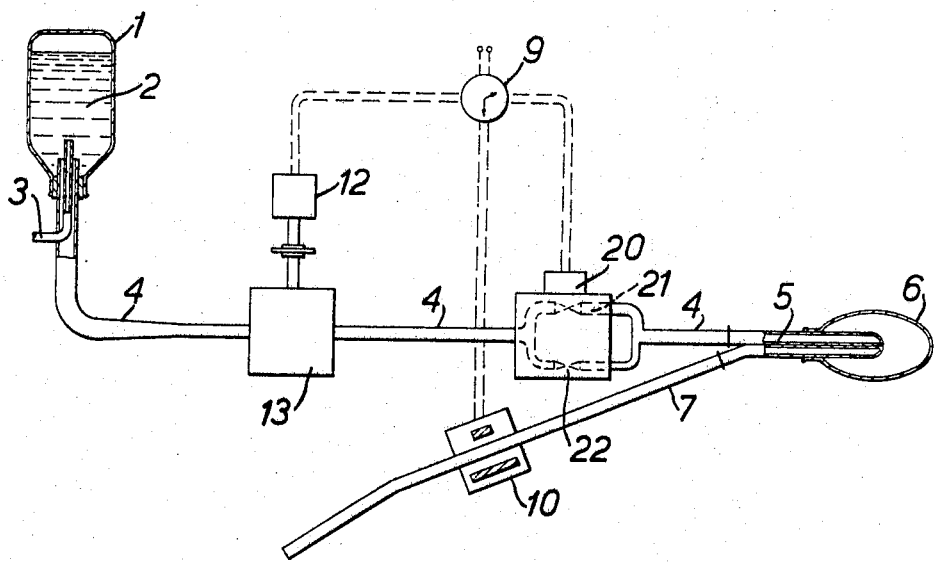
FIG. 5 is a schematic drawing showing the arrangement of the elements of the apparatus which utilizes a single pump with means for obtaining a plurality of flow rates.

FIG. 5 illustrates a bladder irrigating apparatus in which a single pump 13 driven by motor 12 is used to pump irrigating fluid through the piping system of the apparatus. To obtain two different flow rates, control valve 20 with two orifices, one large 21, and one small 22, is used. For low flow rate flushing, the control valve 20 is energized by timer 9, and this acts to close the valve's large orifice 21. At the same time, outlet flow control 10 is de-energized. Due to the high resistance to flow offered by the small orifice 22 in control valve 20, which is left open at all times, irrigating solution will flow at a low rate through the system and will be discharged through discharge tube 7.

For the rapid inflation part of the cycle timer 9 energizes control valve 20 to open the large orifice 21 and energizes also outlet flow control 10. Since discharge is blocked by outlet flow control 10, irrigating solution, which is delivered to the bladder 6, at a relatively high rate of flow, through both the small orifice 22 and the large orifice 21 of the control valve 20, will inflate the bladder. For the deflation step, timer 9 de-energizes outlet flow control 10, causing it to open and at the same time energizes control valve 20 to close the large orifice 21.

What is claimed is:

1. An apparatus for urinary bladder irrigation comprising in combination a vessel containing a solution for irrigating the bladder; a supply tube having first and second sections for carrying the irrigating solution, the inlet of the first section being connected to the outlet of the vessel; a pump having a drive shaft and inlet and outlet ports, whose inlet port is connected to the outlet of the first section of the supply tube; the second section of the supply tube having an inlet connected to the outlet port of the pump; a catheter having an inlet tube and an outlet connection, the inlet tube of the catheter being connected to the outlet of the second section of the supply tube; a discharge tube whose inlet is connected to the outlet connection of the catheter; an outlet flow control means for blocking or permitting flow in the discharge tube; a variable speed transmission means having input and output ends and a speed controlling element, the output end of said transmission being connected to the drive shaft of the pump; a power source connected to the input end of the variable speed transmission means; and a timing device which is connected to and controlling the outlet flow control means for the discharge tube, and which timing device also is connected to and controls the speed controlling element.

2. An apparatus as described in claim 1 in which said supply tube is a single one-piece supply tube, connecting the outlet of the solution supply vessel and the catheter, made of a flexible material such as plastic, which flexible supply tube is placed within said pump, the pump being a volumetric pump of the peristaltic type, according to which arrangement no irrigating solution comes into contact with the pump parts.

3. An apparatus according to claim 2 which has in addition a pressure sensing means connected to the outlet flow control means, which pressure sensing means acts to ensure free flow, or unblocked, condition of the outlet control when a certain predetermined pressure is obtained.

4. An apparatus according to claim 1 which has in addition, a pressure sensing means connected to the outlet flow control means, which pressure sensing means acts to ensure free flow, or unblocked, condition of the outlet control when a certain predetermined pressure is obtained.

5. An apparatus for urinary bladder irrigation comprising in combination a vessel containing a solution for irrigating the bladder; a supply tube having first and second sections for carrying the irrigating solution, the inlet of the first section being connected to the outlet of the vessel; a pump having a drive shaft and inlet and outlet ports, whose inlet port is connected to the outlet of the first section of the supply tube; the second section of the supply tube having an inlet connected to the outlet port of the pump; a catheter having an inlet tube and an outlet connection, the inlet tube of the catheter being connected to the outlet of the second section of the supply tube; a discharge tube whose inlet is connected to the outlet connection of the catheter; an outlet flow control means for blocking or permitting flow in the discharge tube; a power source of variable rotational speed connected to the power input end of the pump, so that the pump can operate at various speeds; and a timing device which is connected to and controls the outlet flow control means for the discharge tube, and which timing device also is connected to and controls the variable power source.

6. An apparatus according to claim 5 which has in addition, a pressure sensing means connected to the outlet flow control means, which pressure sensing means acts to ensure free flow, or unblocked, condition of the outlet control when a certain predetermined pressure is obtained.

References Cited

UNITED STATES PATENTS

| 2,629,399 | 2/1953 | Kulick | 128—227 |
| 3,185,153 | 5/1965 | Leucci | 128—227 |
| 3,329,147 | 7/1967 | Barron | 128—230 |

RICHARD A. GAUDET, Primary Examiner

R. L. FRANKS, Assistant Examiner

U.S. Cl. X.R.

128—227, 240